United States Patent
van Os et al.

(10) Patent No.: US 9,760,246 B2
(45) Date of Patent: Sep. 12, 2017

(54) UNIFIED SETTINGS FOR MULTIPLE ACCOUNT TYPES

(71) Applicant: Apple Inc., Cupertino, CA (US)

(72) Inventors: Marcel Mwa van Os, San Francisco, CA (US); Paul Marcos, Las Altos, CA (US); Evan Doll, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 593 days.

(21) Appl. No.: 13/847,181

(22) Filed: Mar. 19, 2013

(65) Prior Publication Data
US 2013/0318473 A1    Nov. 28, 2013

Related U.S. Application Data

(63) Continuation of application No. 12/190,543, filed on Aug. 12, 2008, now Pat. No. 8,504,001.

(51) Int. Cl.
| | |
|---|---|
| *G06F 3/0482* | (2013.01) |
| *G06Q 10/00* | (2012.01) |
| *G06Q 10/10* | (2012.01) |
| *H04M 1/725* | (2006.01) |

(52) U.S. Cl.
CPC .......... *G06F 3/0482* (2013.01); *G06Q 10/00* (2013.01); *G06Q 10/10* (2013.01); *H04M 1/72563* (2013.01)

(58) Field of Classification Search
CPC ..... G06F 21/41; G06F 21/6209; G06F 3/0482
See application file for complete search history.

(56) References Cited

U.S. PATENT DOCUMENTS

| | | |
|---|---|---|
| 6,986,037 B1 | 1/2006 | Assmann |
| 7,284,045 B1 | 10/2007 | Marl et al. |
| 7,373,386 B2 | 5/2008 | Gardner et al. |
| 7,660,861 B2 | 2/2010 | Taylor |
| 7,673,327 B1 | 3/2010 | Polis et al. |
| 2004/0205501 A1 | 10/2004 | Gupta |
| 2005/0033830 A1 | 2/2005 | Gorty |
| 2006/0009243 A1 | 1/2006 | Dahan et al. |
| 2006/0200524 A1 | 9/2006 | Costenaro et al. |

(Continued)

OTHER PUBLICATIONS

U.S. Non-Final Office Action for U.S. Appl. No. 12/190,543 dated Apr. 28, 2011, 8 pages.

(Continued)

*Primary Examiner* — Sherrod Keaton
(74) *Attorney, Agent, or Firm* — Blakely, Sokoloff, Taylor & Zafman LLP

(57) ABSTRACT

Account types that support one or more data classes (e.g., email, contacts, calendar, instant messaging) can be added and configured on a mobile device using a unified settings user interface. The user interface allows the user to easily activate and deactivate one or more data classes for an account type. The user interface can support one or more predefined account types and can allow the user to add and configure new account types. Visual indicators are provided in the user interface to remind the user of the data classes that are active on the mobile device for a particular account. Users can configure settings that effect a particular data class in all accounts on the mobile device. Users can also configure settings that are specific to a particular account.

23 Claims, 14 Drawing Sheets

(56) References Cited

U.S. PATENT DOCUMENTS

| | | |
|---|---|---|
| 2007/0185962 A1 | 8/2007 | Bocking et al. |
| 2008/0037583 A1* | 2/2008 | Dawes .................. G06Q 10/06 |
| | | 370/467 |
| 2008/0095336 A1 | 4/2008 | Tysowski et al. |
| 2008/0098464 A1 | 4/2008 | Mizrah |
| 2008/0256203 A1 | 10/2008 | Gorty et al. |
| 2008/0307077 A1 | 12/2008 | Langoulant |
| 2009/0003542 A1* | 1/2009 | Ramanathan .......... H04L 51/14 |
| | | 379/88.13 |
| 2009/0093242 A1* | 4/2009 | Bhalekar ........... H04M 1/72552 |
| | | 455/418 |
| 2009/0318172 A1 | 12/2009 | Vanderveen et al. |

OTHER PUBLICATIONS

U.S. Non-Final Office Action for U.S. Appl. No. 12/190,543 dated Sep. 30, 2011, 9 pages.
U.S. Final Office Action for U.S. Appl. No. 12/190,543 dated Feb. 17, 2012, 10 pages.
U.S. Non-Final Office Action for U.S. Appl. No. 12/190,543 dated Jun. 28, 2012, 17 pages.
U.S. Notice of Allowance for U.S. Appl. No. 12/190,543 dated Jan. 4, 2013, 12 pages.

\* cited by examiner

UNIFIED SETTINGS FOR MULTIPLE ACCOUNT TYPES

CROSS-REFERENCE TO RELATED APPLICATIONS

This application is a continuation (and claims the benefit of priority under 37 USC 120) of U.S. application Ser. No. 12/190,543, filed Aug. 12, 2008, now issued as U.S. Pat. No. 8,504,001, and titled "Unified Settings for Multiple Account Types," which is incorporated by reference.

TECHNICAL FIELD

This subject matter is generally related to user interfaces for mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, a browser to surf the Internet, etc. Modern mobile devices can include two or more of these applications.

Mobile devices can include a settings option for configuring applications and features of the mobile device to suit the needs of the user. For example, a settings option can be used to configure a feature such as the "brightness" of the display. A settings option can also be used to configure an application corresponding to an account. While configuring settings for a single account can be fairly simple, configuring settings for accounts that can support two or more data classes, such as email, contacts and calendars can be more challenging.

SUMMARY

Account types that support one or more data classes (e.g., email, contacts, calendar, instant messaging) can be added and configured on a mobile device using a unified settings user interface. The user interface allows the user to easily activate and deactivate one or more data classes for an account type. The user interface can support one or more predefined account types and can allow the user to add and configure new account types. Visual indicators are provided in the user interface to remind the user of the data classes that are active on the mobile device for a particular account. Users can configure settings that effect a particular data class in all accounts on the mobile device. Users can also configure settings that are specific to a particular account. Other implementations are disclosed which are directed to systems, methods and computer-readable mediums.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Mobile Device Overview

Figure 1:
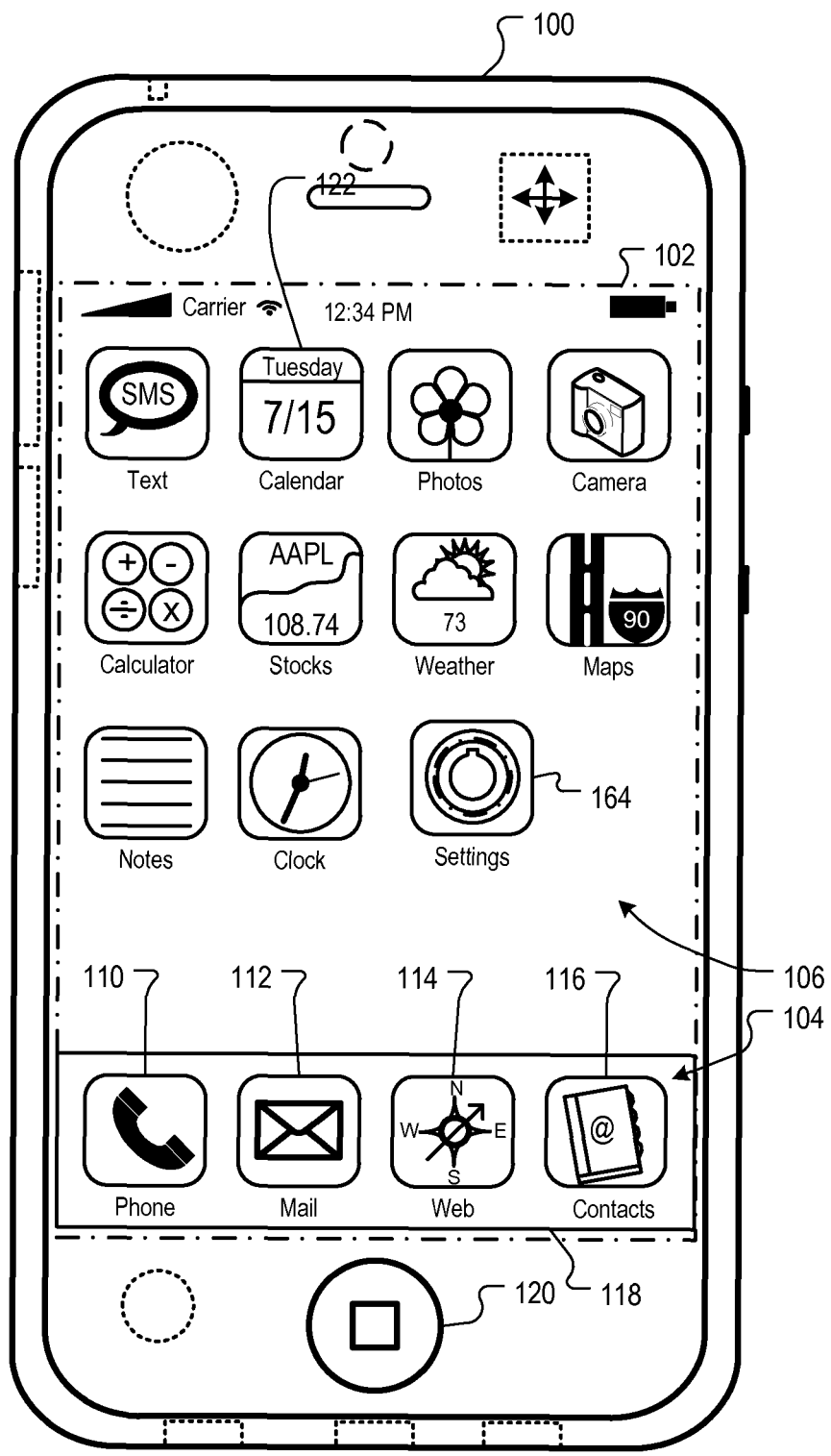
FIG. 1 is a block diagram of an example mobile device.

FIG. 1 is a block diagram of an example mobile device 100. For example, the mobile device 100 can be a cellular phone, a personal digital assistant (PDA), or a portable media device (e.g., a portable MPEG-1 Audio Layer 3 (MP3) player, a portable DVD player, etc.). Some examples of the mobile device 100 may be an iPhone™ or an iPod Touch™ of Apple Inc. in Cupertino, Calif.

In some implementations, the mobile device 100 includes a touch-sensitive display or device 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display. A multi-touch-sensitive display can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can include multiple device functionalities, such as a telephony device, as indicated by a phone object 110; an e-mail device, as indicated by the e-mail object 112; a network data communication device, as indicated by the Web object 114; an address book object, as indicated by the contacts object 116; and a calendar device, as indicated by the calendar object 122. In some implementations, mobile device 100 can include a "settings" object 164. In some implementations, particular display objects 104 (e.g., the phone object 110, the e-mail object 112, the Web object 114, the contacts object 116, and the calendar object 122), can be displayed in a menu bar 118. In some implementations, device functionalities can be accessed from a top-level graphical user interface, such as the graphical user interface illustrated in FIG. 1. Touching one of the objects 110, 112, 114, 116, 122, or 164 can, for example, invoke corresponding functionality.

In some implementations, upon invocation of a device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; touching the contacts object 116 may cause the graphical user interface to present display objects related to various address book functions; touching the calendar object 122 may cause the graphical user interface to present display objects related to various calendar functions; and touching the settings object 164 may cause the graphical user interface to present objects related to various settings functions.

In some implementations, a top-level graphical user interface environment or "home screen" of FIG. 1 can be restored by pressing a button 120 located near the bottom of the mobile device 100. In some implementations, each device functionality may have a corresponding "home" display object displayed on the touch-sensitive display 102. In these implementations, pressing the "home" display object can restore the graphical user interface environment of FIG. 1.

Various software applications can be executed by the mobile device 100. For example, a user can use an email application to send and/or receive one or more email communications. In another example, a user can use an address book application to access one or more contacts in the address book. A contact can be an individual, a group of individuals (e.g., a club), or an entity (e.g., a business or a location for a business). In yet another example, a user can use a calendar application to schedule one or more appointments or receive one or more reminders. In some implementations, each application can include one or more application settings. In some implementations, touching or otherwise interacting with the settings object 164 can cause the graphical user interface to present options related to various application settings.

Example Application Settings

Figure 2:
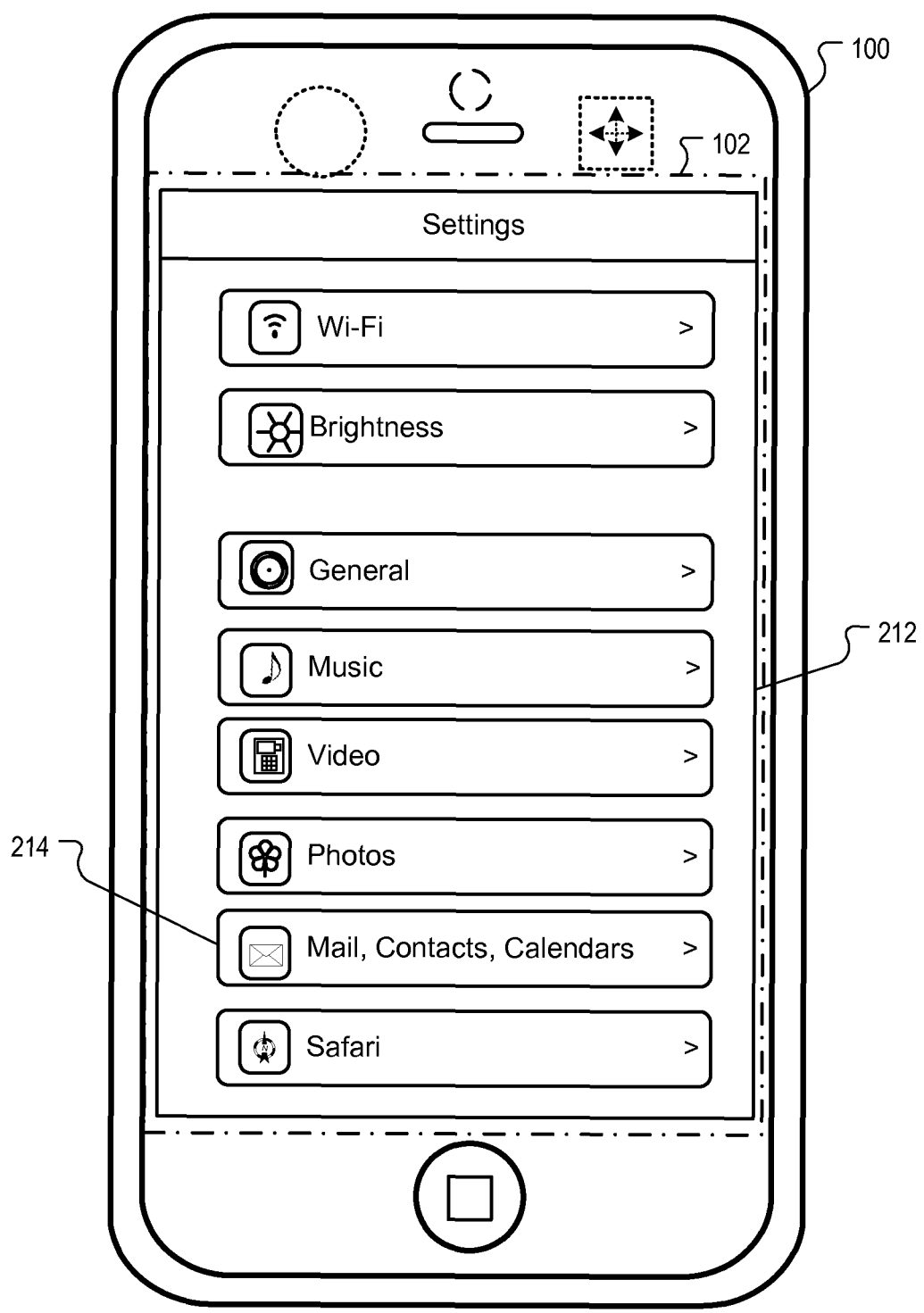
FIG. 2 is a block diagram of an example mobile device including a page associated with settings options.

FIG. 2 is a block diagram of an example mobile device 100 including a page 212 associated with settings options. Settings options can include options for creating, viewing, or changing one or more settings associated with one or more applications. The user can tap or gesture on the touch sensitive display 102 to select a "Mail, contacts, calendar" option 214 to access one or more accounts associated with mail, contacts and calendars.

Figure 3A:
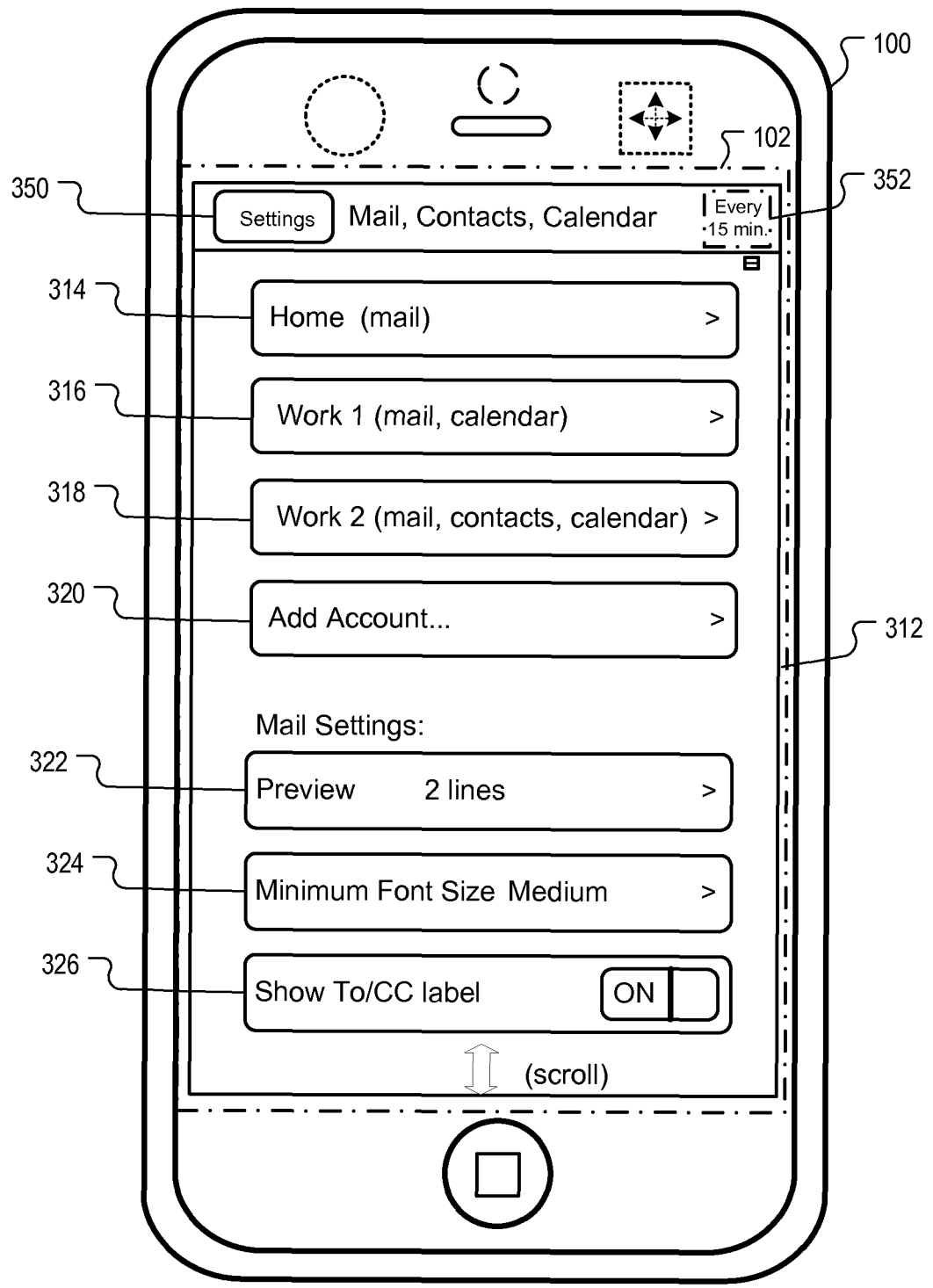
FIGS. 3A-C are block diagrams of an example mobile device including a page associated with the "mail, contacts, calendar" option in FIG. 2.
Figure 3B:
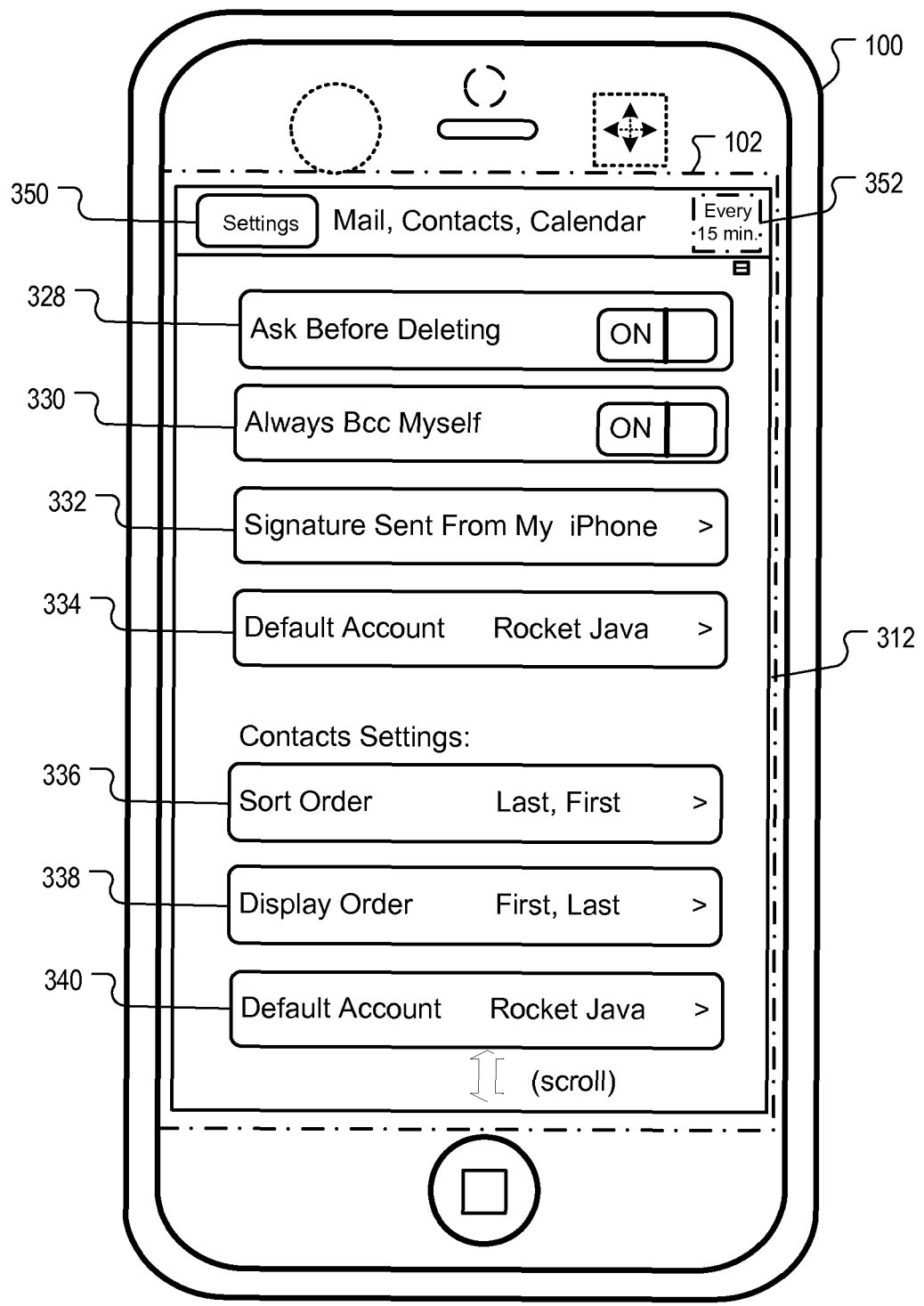
Figure 3C:
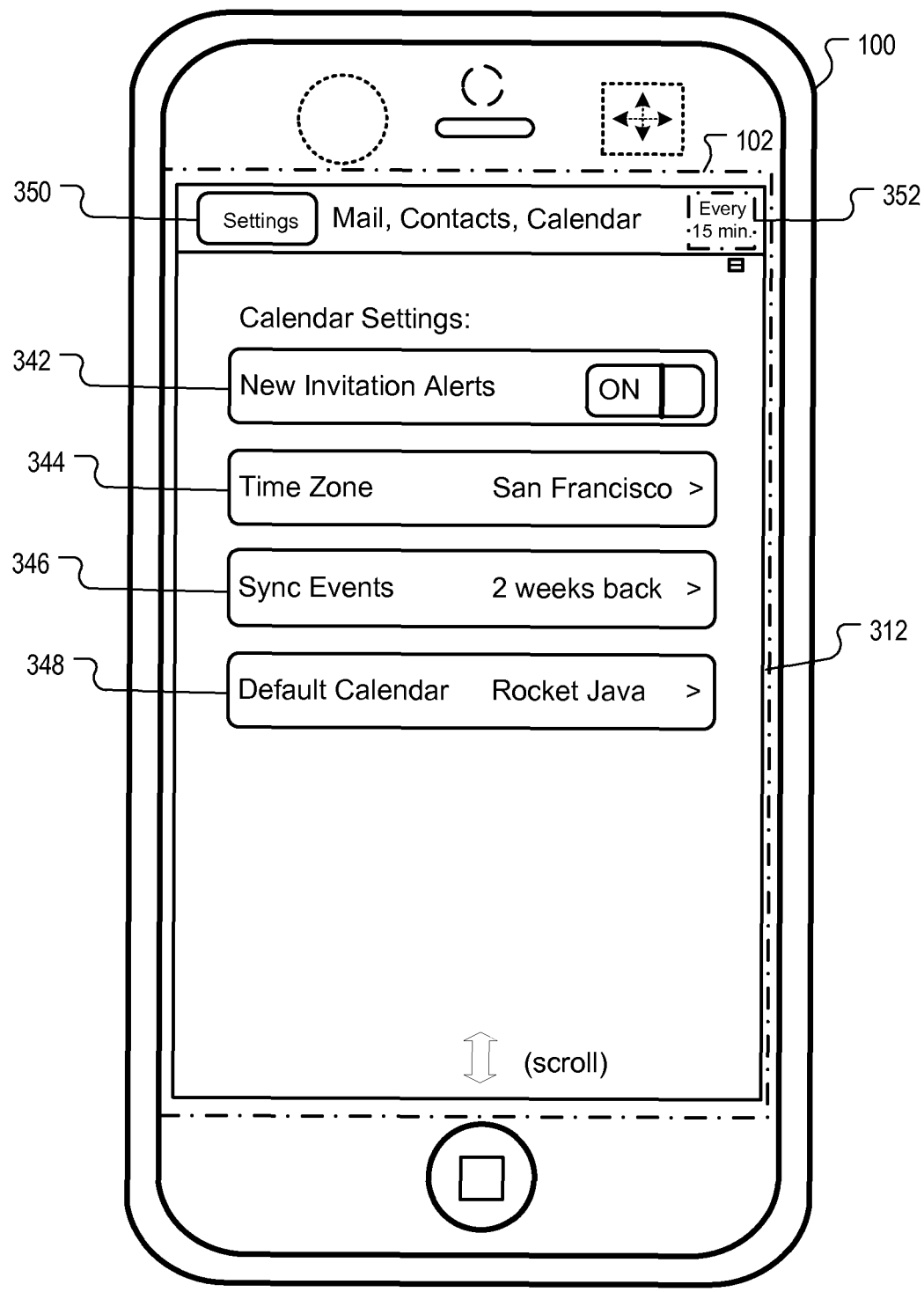

FIGS. 3A-3C are block diagrams of an example mobile device 100 including a scrollable page 312 which is presented on the touch-sensitive display 102 when the user touches the option 214 in FIG. 2. The page 312 can include a list of accounts having the "Mail, Contacts, Calendar" account type, (e.g., accounts including a combination of email settings, contacts settings, and/or calendar settings). In some implementations, all or some of these data classes can be synchronized with one or more other accounts (e.g., network-based accounts). The scrolling of page 312 can be initiated by the user making a "flicking" gesture in the vertical direction on the touch-sensitive display 102.

Referring to FIG. 3A, the page 312 can include options for accessing and configuring one or more accounts which have been added by the user to the mobile device 100. In the example shown, the user added a Home account 314, a Work 1 account 316, and a Work 2 account 318. The Home account 314 supports email, the Work 1 account 316 supports mail and calendars, and the Work 2 account 318 supports mail, contacts and calendars. The user can add more accounts by selecting the "Add Account" option 320, as will be described in reference to FIG. 5.

In some implementations, an account 314, 316, or 318 can include a visual indication of the data classes associated with that account. For example, the Work 2 account option 318 includes text describing three data classes: mail, contacts and calendar. Other visual indicators can also be used, such as a an envelope icon for email, an address book icon for contacts and a calendar icon for calendar. Thus, with visual indicators the user can quickly determine by visual inspection what data classes are currently active for a given account.

On page 312, settings for one or more data classes can be set for any of the active accounts 314, 316 and 318. For example, email can include a "Preview" setting 322 allowing the user to set the number of lines that can be previewed for each email message. A "Minimum Font Size" setting 324 can allow the user to set a minimum font size applicable to each email message. A "Show To/CC label" setting 326 can include an on/off option which can be toggled on and off using touch input. Setting the on/off option to "on" can allow the user to view a visual indication proximate to a received message showing how the message was sent to the user (e.g., directly or as a Carbon Copy (CC)). An advantage of this unified system is that settings, like those described above, can be applied to all available accounts using the affected data class.

FIG. 3B depicts settings for mail and contacts. These additional settings are viewable by scrolling the page 312 using the "flicking" gesture as previously described. Additional email settings can include an "Ask Before Deleting" setting 328 including an on/off option. Setting the on/off option to "on" can cause the mobile device 100 to present a confirmation to the user before deleting a message. An "Always Bcc Myself" setting 330 including an on/off option can allow a user to set whether a copy of every message sent by the user is Blind carbon copied (Bcc) to the user. A "Signature Sent From My" setting 332 can be set to cause the mobile device 100 to add a user created signature to every sent message. A "Default Account" setting 334 can be set to cause the mobile device 100 to send and receive messages from a default email account (e.g., the "Rocket Java" account). In some implementations, a "Default Account" setting 334 will only appear when more than one account using the same data class is available on the mobile device 100.

In some implementations, the contacts settings can include a "Sort Order" setting 336 which can be set to determine an alphabetical sort order for contacts (e.g., sorting by first or last name). A "Display Order" setting 338 can be set to cause the mobile device 100 to display contacts in a particular order (e.g., by first or last name). A "Default Account" setting 340 can be set to cause the mobile device 100 to add new contacts to a default account (e.g., the "Rocket Java" account). In some implementations, a Default Account setting 340 will only appear when more than one account is available on the mobile device 100.

FIG. 3C depicts calendar settings. The calendar settings are viewable on the page 312 after the page 312 has been scrolled using the "flicking" gesture as previously described. Calendar settings can include a "New Invitation Alerts" setting 342 including an on/off option. Setting the on/off option to "on" can cause the mobile device 100 to add an invitation from another device to a calendar. A "Time Zone" setting 344 can be set to cause calendar events to be displayed in a calendar for a specified time zone (e.g., "San Francisco"). A "Sync Events" setting 346 can be set to indicate which events in a calendar will be synced. More particularly, the setting 346 controls how far back events should be synced. This setting allows the user to avoid syncing too much stale data. A "Default Calendar" setting 348 can be set to cause the mobile device 100 to add events to a default calendar (e.g., the "Rocket Java" calendar). In some implementations, a Default Calendar setting 348 will only appear when more than one account is available on the mobile device 100.

In some implementations, the page 312 can include a settings button 350. Touching the settings button 350 can cause the mobile device 100 to return to and display the settings page 212 on the touch sensitive display 102. In some implementations, the page 312 can include a synchronization indication 352 notifying the user how often data will be synchronized with other accounts (e.g., "every 15 minutes"). Synchronization for the various data classes can be performed by tethering the mobile device to a host device or "over the air" using a wireless network.

Example Account

Figure 4:
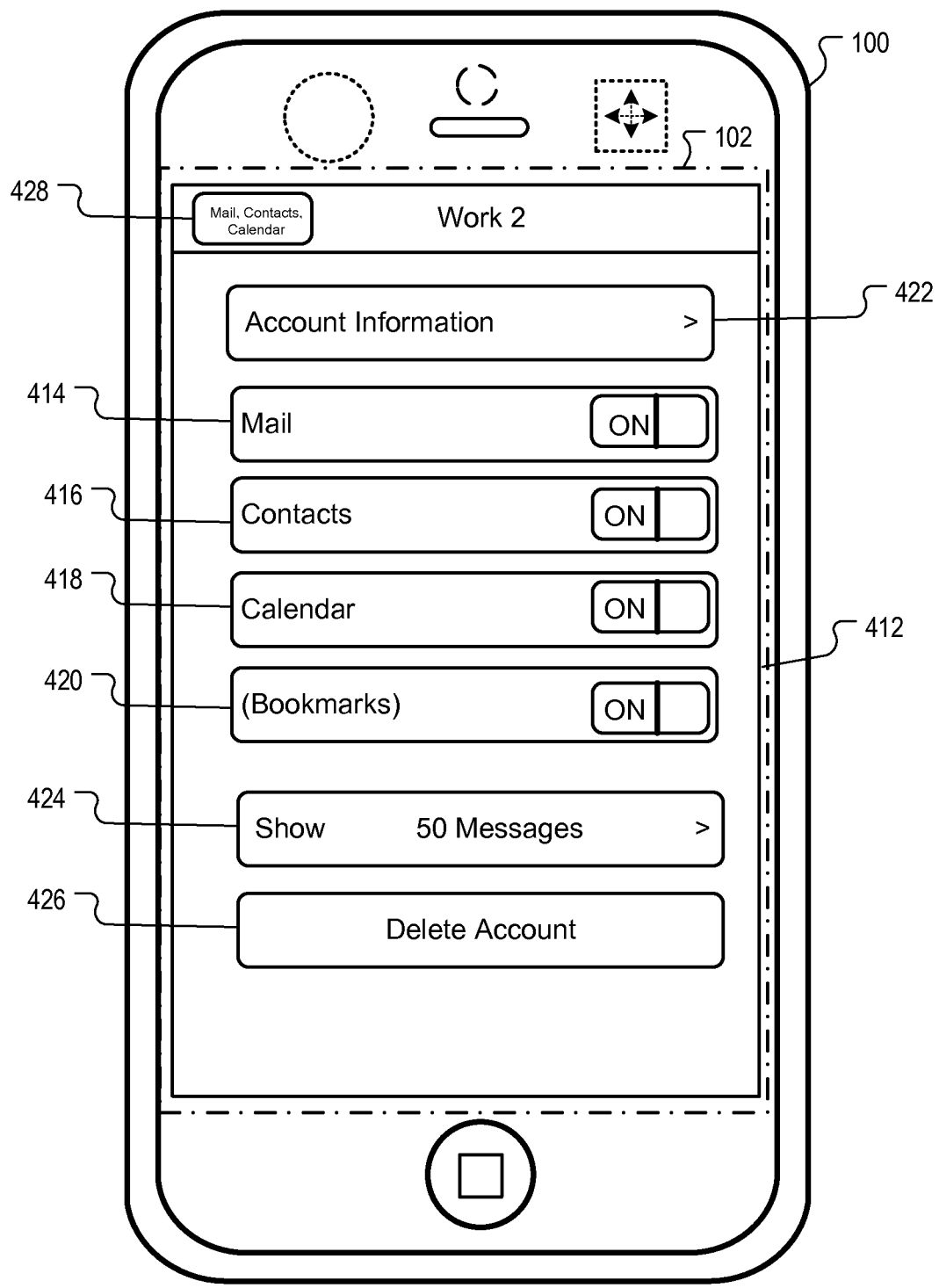
FIG. 4 is a block diagram of an example mobile device including a page associated with an account in FIG. 3A.

FIG. 4 is a block diagram of an example mobile device 100 including a page 412 associated with the Work 2 account 318 shown in FIG. 3A. Selecting the option 318 in FIG. 3A can cause the graphical user interface to present a Work 2 account page 412 on the touch sensitive display 102 of the mobile device 100. In this example, the Work 2 account 318 is associated with multiple data classes: mail, contacts, calendar and bookmarks. The option 428 can cause the previous page 312 to be displayed. The "Account Information" option 422 can cause account information to be displayed. The settings 414, 416, 418, 420, can be toggled on and off by the user to activate and deactivate the corresponding data classes. In some implementations, a "Show" option 424 can provide a visual indication of the number of most recent email messages received that will be displayed in the user's inbox. The user can set and change this number as desired. The Work 2 account 318 can be deleted by selecting the "Delete Account" option 426. Sometimes settings have to be located into a specific account since the settings have a specific set of options related to that specific account and no other. The Show option 424 here can be used with certain accounts (e.g., MS Exchange accounts) that cannot show number of most recent email messages received.

Example Addition of an Account

Figure 5:
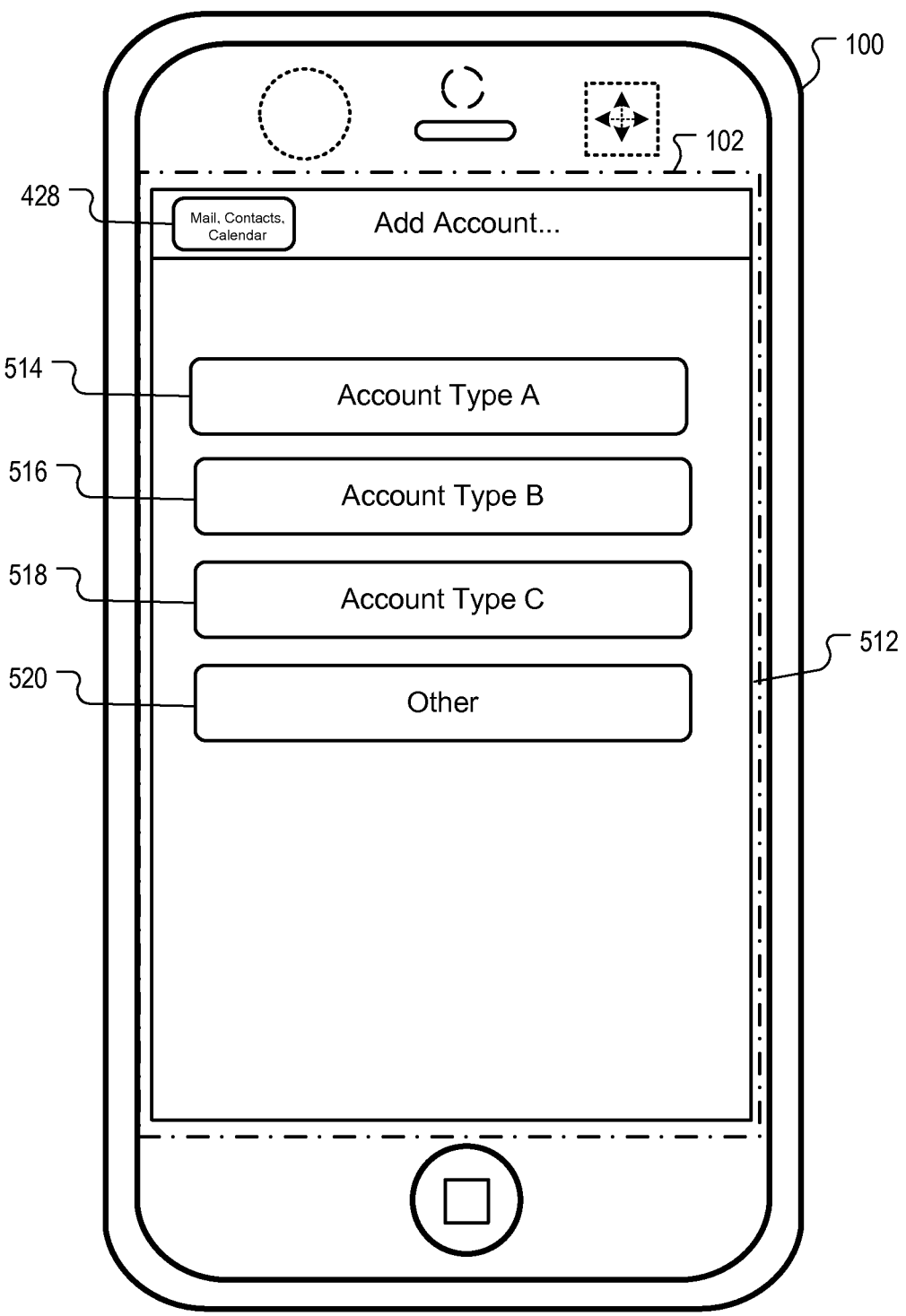
FIG. 5 is a block diagram of an example mobile device including a page associated with the "Add Account . . . " option in FIG. 3A.

FIG. 5 is a block diagram of an example mobile device 100 including a page 512 associated with the "Add Account . . . " option 320 in FIG. 3A. In some implementations, selecting the Add Account option 320 in FIG. 3A can cause the mobile device to display the Add Account page 512 on the touch sensitive display 102. In some implementations, the Add Account page 512 can include one or more account types (e.g., account type 514 ("Account Type A"), account type 516 ("Account Type B"), or account type 518 ("Account Type C"). An account type (e.g., MobileMe™) can be associated with one or more data classes. For example, a MobileMe™ account can be associated with email, contacts, a calendar, and bookmarks. Selecting an account type 514, 516, or 518 can cause the mobile device to display a page for creating a new account in accordance with the account type selected (e.g., Microsoft® Exchange account). In some implementations, the page 512 can include an "Other" option 520 which will be described in reference to FIG. 8.

Figure 6:
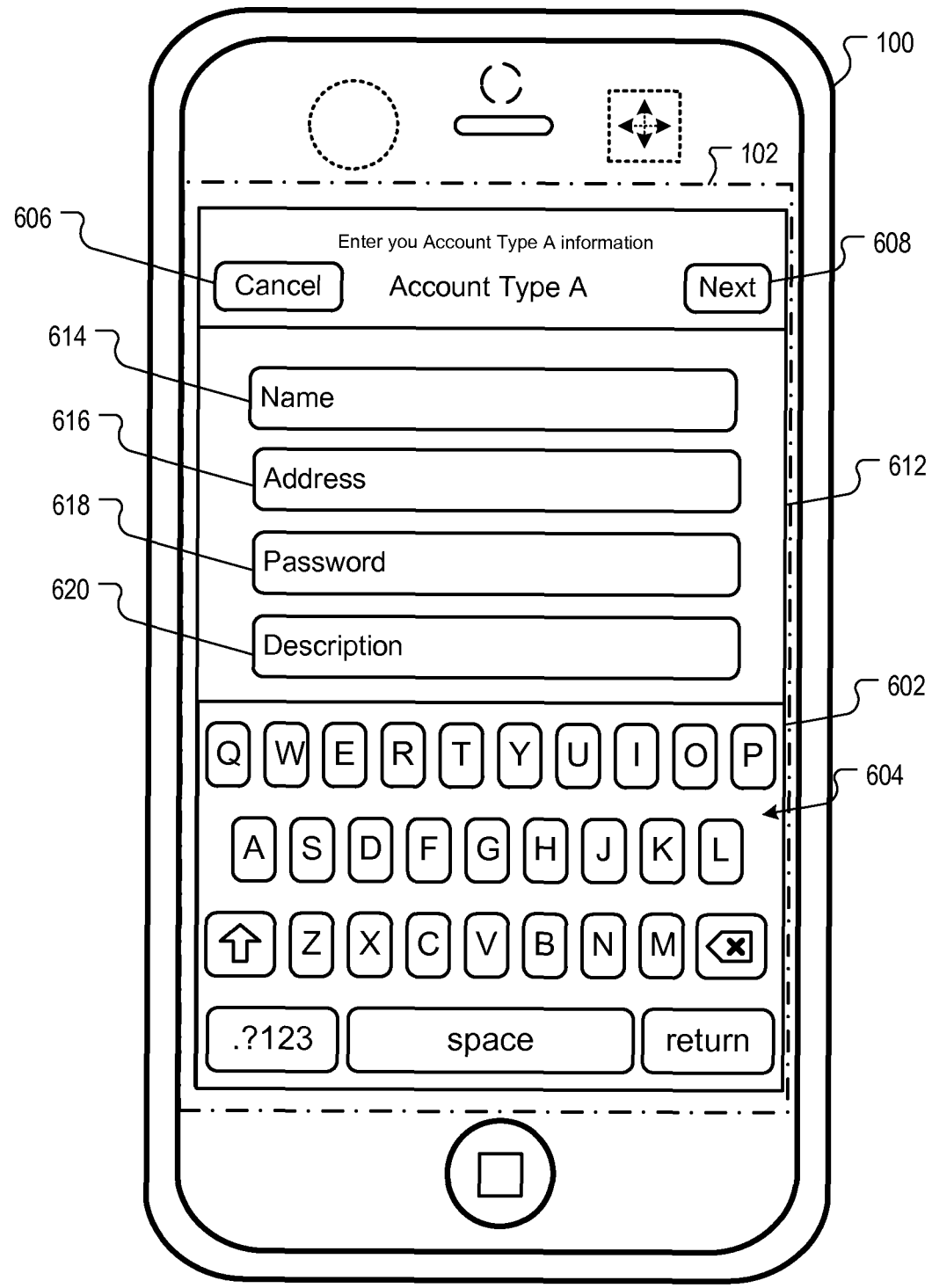
FIG. 6 is a block diagram of an example mobile device depicting a virtual keyboard used to create an account of account type A.

FIG. 6 is a block diagram of an example mobile device 100 depicting a virtual keyboard 602 used to create an account of Account Type A. In some implementations, selecting the Account Type A option 514 in FIG. 5 can cause the mobile device to display an Account Type A page 612 on the touch sensitive display 102. In some implementations, a virtual keyboard can be displayed on the page 612. In these implementations, the virtual keyboard can allow the user to type in a name 614, an address 616, a password 618, and a description 620 for an account (e.g., "Work 2"). The virtual keyboard 602 can include buttons or keys 604. In one example, the user can select a character by tapping a key on the virtual keyboard 602 that corresponds to the character. The user can also select a cancel button 606 if the user decides not to create an account. In some implementations, after inputting a name, address, password, and account description, a user can select a next button 608. Selecting the next button 608 can cause the mobile device 100 and/or a network-based server to authenticate the account. In some implementations, the same screen can be repeated when authentication has failed with some additional information to assist the user in identifying the cause of the failure.

Figure 7:
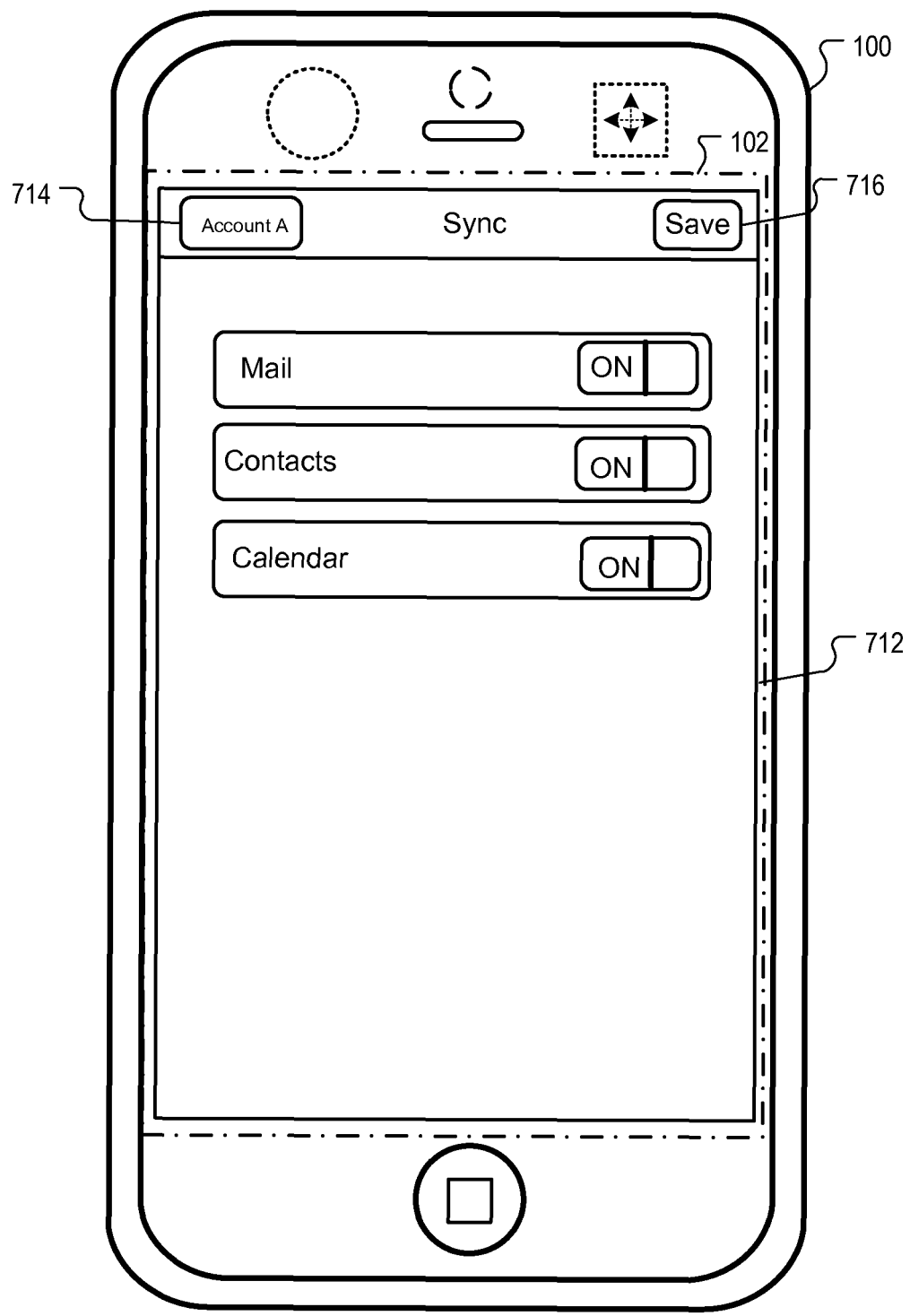
FIG. 7 is a block diagram of an example mobile device including a page for allowing the user to activate or deactivate various data classes for a newly created account.

FIG. 7 is a block diagram of an example mobile device 100 including a Sync page 712 for allowing the user to activate or deactivate various data classes for a newly created account. In some implementations, the page 712 can include a Save button 716. Selecting the button 716 can allow the user to save the settings for the newly created account. In some implementations, the page 712 can include an Account A button 714. Touching the button 714 can cause the mobile device 100 to display the previous page 612 on the touch sensitive display 102.

Figure 8:
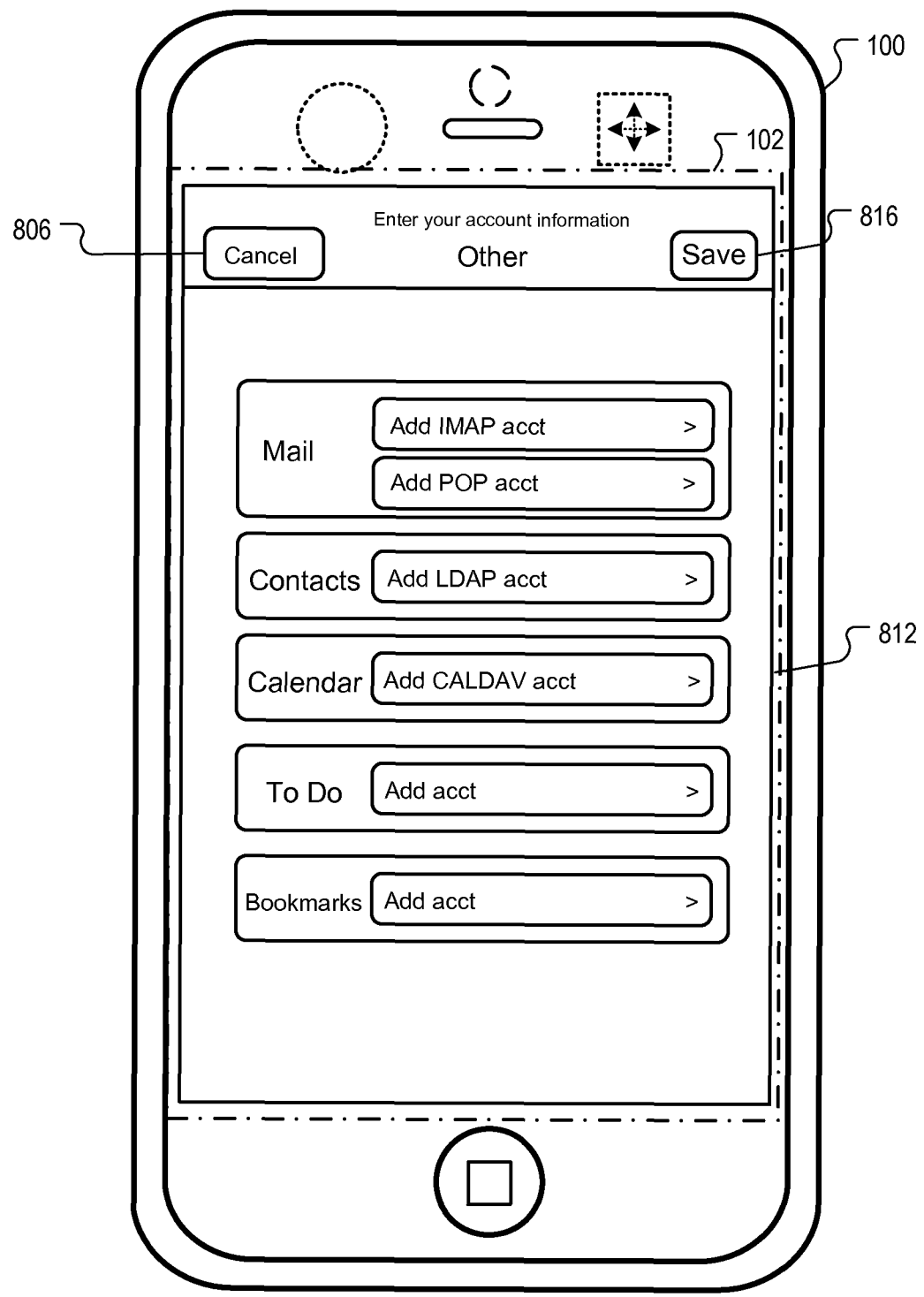
FIG. 8 is a block diagram of an example mobile device including a page that is displayed when a user selects the "Other" option in FIG. 5.

FIG. 8 is a block diagram of an example mobile device 100 including a page 812 that is displayed when a user selects the "Other" option 520 in FIG. 5. In some implementations, selecting the Other option 520 can facilitate the creation of a new account that is not preconfigured on the mobile device 100. In some implementations, the page 812 can include a Save button 816. Selecting the button 816 can allow the user to save the settings for the new account. The user can also select a Cancel button 806 if the user decides not to create an account.

In some implementations, the mobile device 100 can present the user with the option of adding new data classes to an account. For example, a MobileMe™ account can currently support email, contacts, a calendar, and bookmarks. If at some point in the future a MobileMe™ account was able to support a "To Do" data class, the mobile device 100 could present the user with that option automatically. In some implementations, an option such as an "on/off" switch can appear on the mobile device 100 when a new data class becomes available. With these implementations, the mobile device 100 can adapt to new communications standards that may introduce new data classes. In some implementations, an option can be presented that allows the user to verify the account with a password when a new data class for the account is activated.

In some implementations, the mobile device 100 can present the user with the option of importing information stored on a removable memory module such as a single in-line memory module or "SIMM" card. In these implementations, the mobile device 100 can detect the SIMM card and present a button option to the user. Selecting the button option can cause the mobile device 100 to present a list to the user of accounts that are contacts capable. Selection of an account can cause the contacts associated with that account to be imported onto the mobile device 100.

In some implementations, the mobile device 100 can present the user with the option of over the air (OTA) or wireless synchronization. In these implementations, the mobile device 100 can present the user with the option to replace existing data with new data, merge existing data with new data, or merge existing data with new data and replace redundant or outdated data. In some implementations, the mobile device 100 can present the user with a warning when the creation of a new account will automatically replace data.

Example New Account Creation Process

Figure 9:
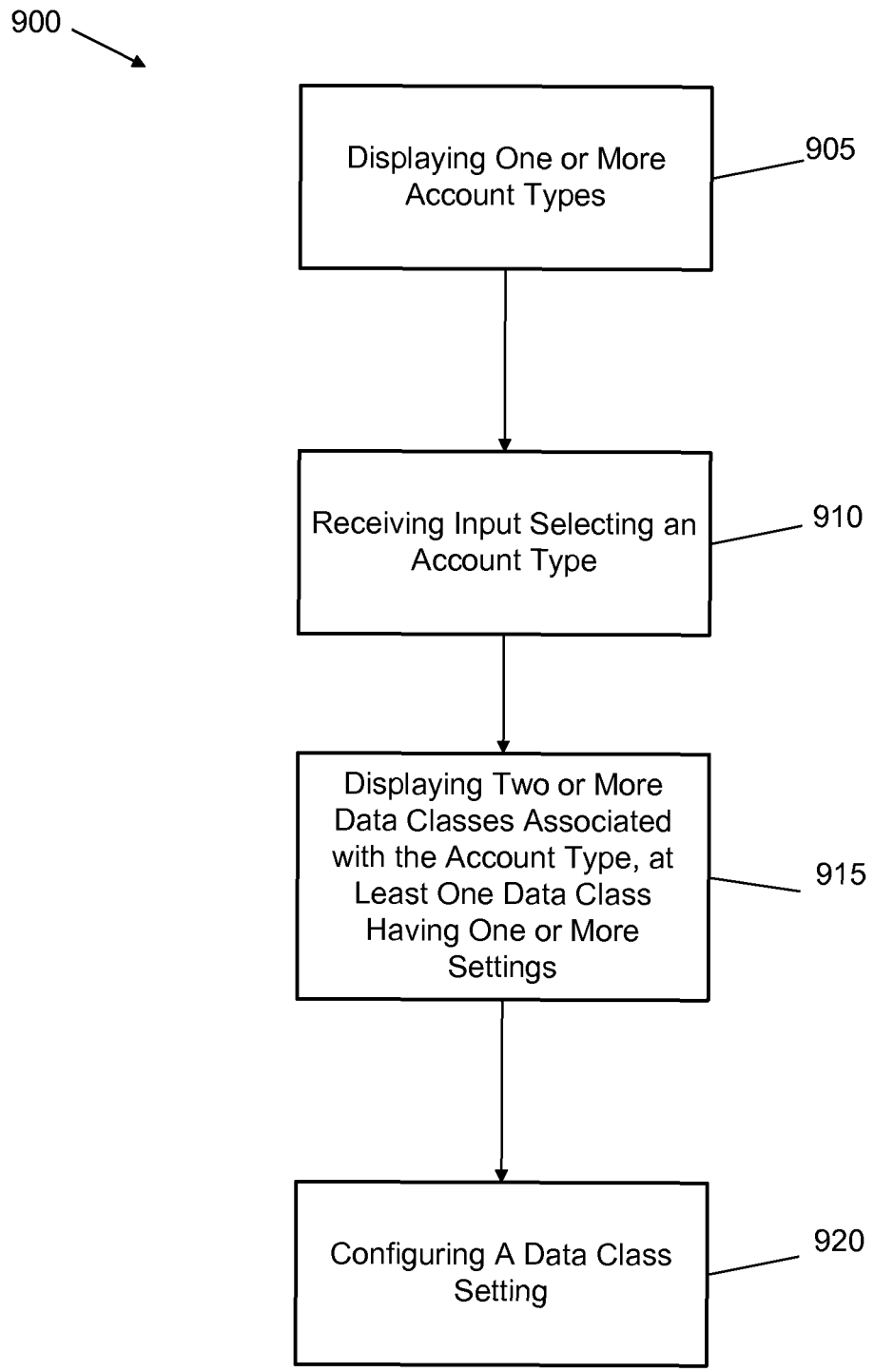
FIG. 9 is flow diagram of a process for creating new accounts.

FIG. 9 is flow diagram of a process 900 for creating new accounts. The process 900 begins when one or more account types are displayed on a user interface of the mobile device (905). An input selecting an account type is received through the user interface (910). The input can be the user touching a user interface element which is detected by a touch-sensitive display. The input can cause an option page to be presented to the user. The option page can allow the user to select an option to create an account. One or more data classes associated with the account type can be displayed on the user interface of the mobile device (915). At least one of the data classes can include one or more settings. The one or more settings can be configured (920) by the user. For example, the user can activate or deactivate one or more data classes.

Example Process for Changing Existing Account Settings

Figure 10:
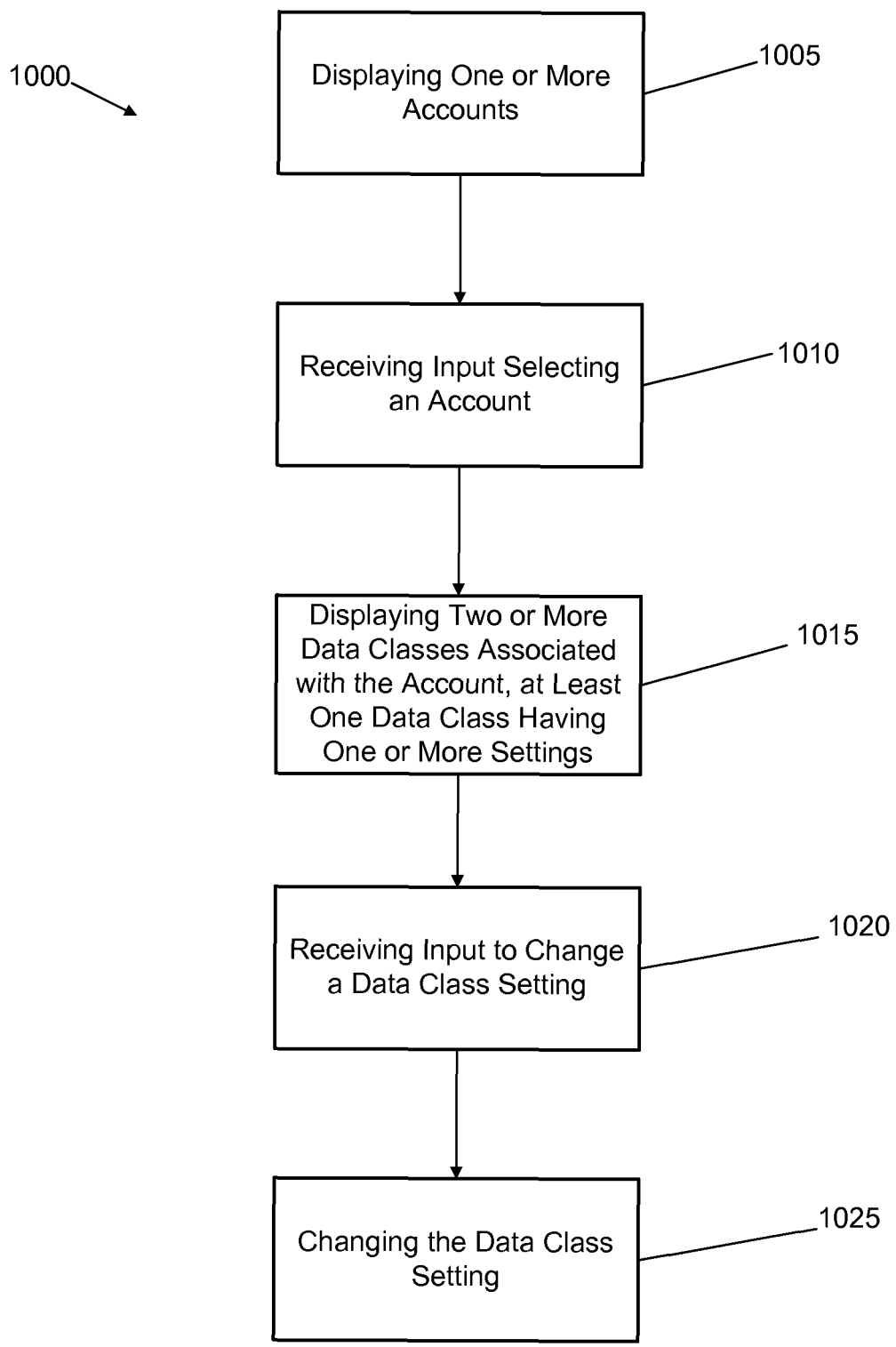
FIG. 10 is a flow diagram of a process for configuring account settings for existing accounts.

FIG. 10 is a flow diagram of a process 1000 for configuring account settings for existing accounts. The process 1000 begins when one or more accounts are displayed on a user interface of the mobile device (1005). An input selecting an account is received through the user interface (1010). The input can be the user touching a user interface element. The input can be detected by a touch-sensitive display. The input can cause an option page to be presented to the user. The option page can allow the user to select an option to configure an account setting. One or more data classes associated with the account can be displayed on the user interface of the mobile device (1015). At least one of the data classes can include one or more settings. An input configuring a data class setting is received through the user interface (1020). The data class setting is changed (1025) based on the input.

Example Network Operating Environment

Figure 11:
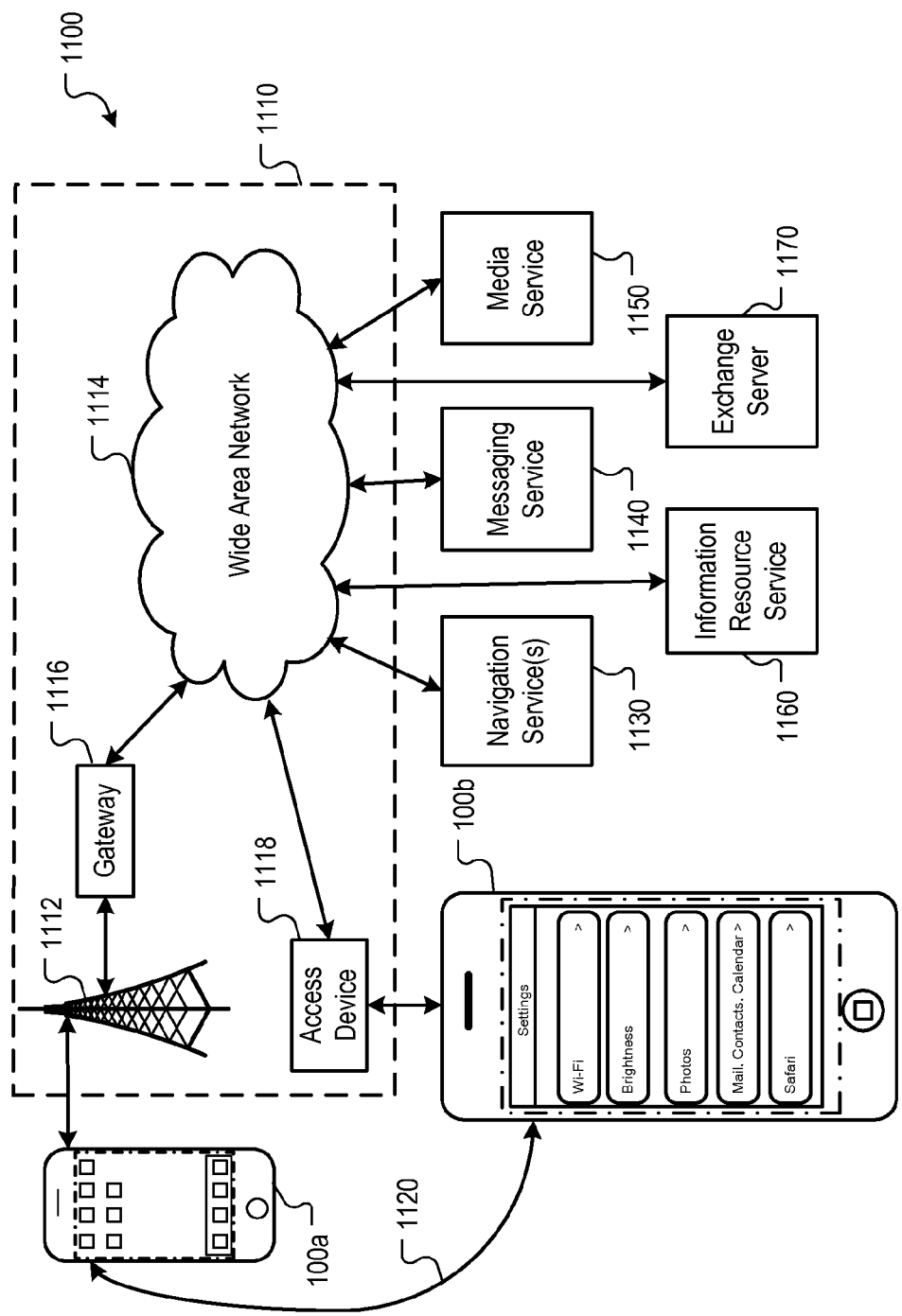
FIG. 11 is a block diagram of an example of a mobile device operating environment.

FIG. 11 is a block diagram 1100 of an example of a mobile device operating environment. The mobile device 100 of FIG. 1 can, for example, communicate over one or more wired and/or wireless networks 1110 in data communication. For example, a wireless network 1112 (e.g., a cellular network), can communicate with a wide area network (WAN) 1114, such as the Internet, by use of a gateway 1116. Likewise, an access point 1118, such as an 802.11g wireless access point, can provide communication access to the wide area network 1114. In some implementations, both voice and data communications can be established over the wireless network 1112 and the access point 1118.

For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 1112, gateway 1116, and wide area network 1114 (e.g., using TCP/IP or UDP protocols). Likewise, the mobile device 100b can place and receive phone calls, send and receive e-mail messages, and retrieve electronic documents over the access point 1118 and the wide area network 1114. In some implementations, the mobile device 100 can be physically connected to the access point 1118 using one or more cables and the access point 1118 can be a personal computer. In this configuration, the mobile device 100 can be referred to as a "tethered" device.

The mobile devices 100a and 100b can also establish communications by other means (e.g., wireless communications). For example, the mobile device 100a can communicate with other mobile devices (e.g., other wireless devices, cell phones, etc.), over the wireless network 1112. Likewise, the mobile devices 100a and 100b can establish peer-to-peer communications 1120 (e.g., a personal area network), by use of one or more communication subsystems (e.g., a Bluetooth™ communication device). Other communication protocols and topologies can also be implemented.

The mobile device 100 can, for example, communicate with one or more services 1130, 1140, 1150, 1160, and 1170 over the one or more wired and/or wireless networks 1110. For example, a navigation service 1130 can provide navigation information (e.g., map information, location information, route information, and other information), to the mobile device 100.

A messaging service 1140 can, for example, provide e-mail and/or other messaging services. A media service 1150 can, for example, provide access to media files, such as song files, movie files, video clips, and other media data. A syncing service 1160 can, for example, perform syncing services (e.g., sync files). An exchange server 1170 (e.g., Microsoft® Exchange server) can, for example, perform synchronization services for the mobile device 100. Other services can also be provided, including a software update service that automatically determines whether software updates exist for software on the mobile device 100, then downloads the software updates to the mobile device 100 where it can be manually or automatically unpacked and/or installed.

The mobile device 100 can also access other data and content over the one or more wired and/or wireless networks 1110. Such access can be provided by invocation of a web browsing function or application (e.g., a browser) in response to a user touching the Web object 114 depicted in FIG. 1. In the example shown, a user of the mobile device 100b has invoked an icon functionality (e.g., by pressing the settings object 164 on the top-level graphical user interface shown in FIG. 1), and has requested and received the settings page associated with the settings object 164.

Example Mobile Device Architecture

Figure 12:
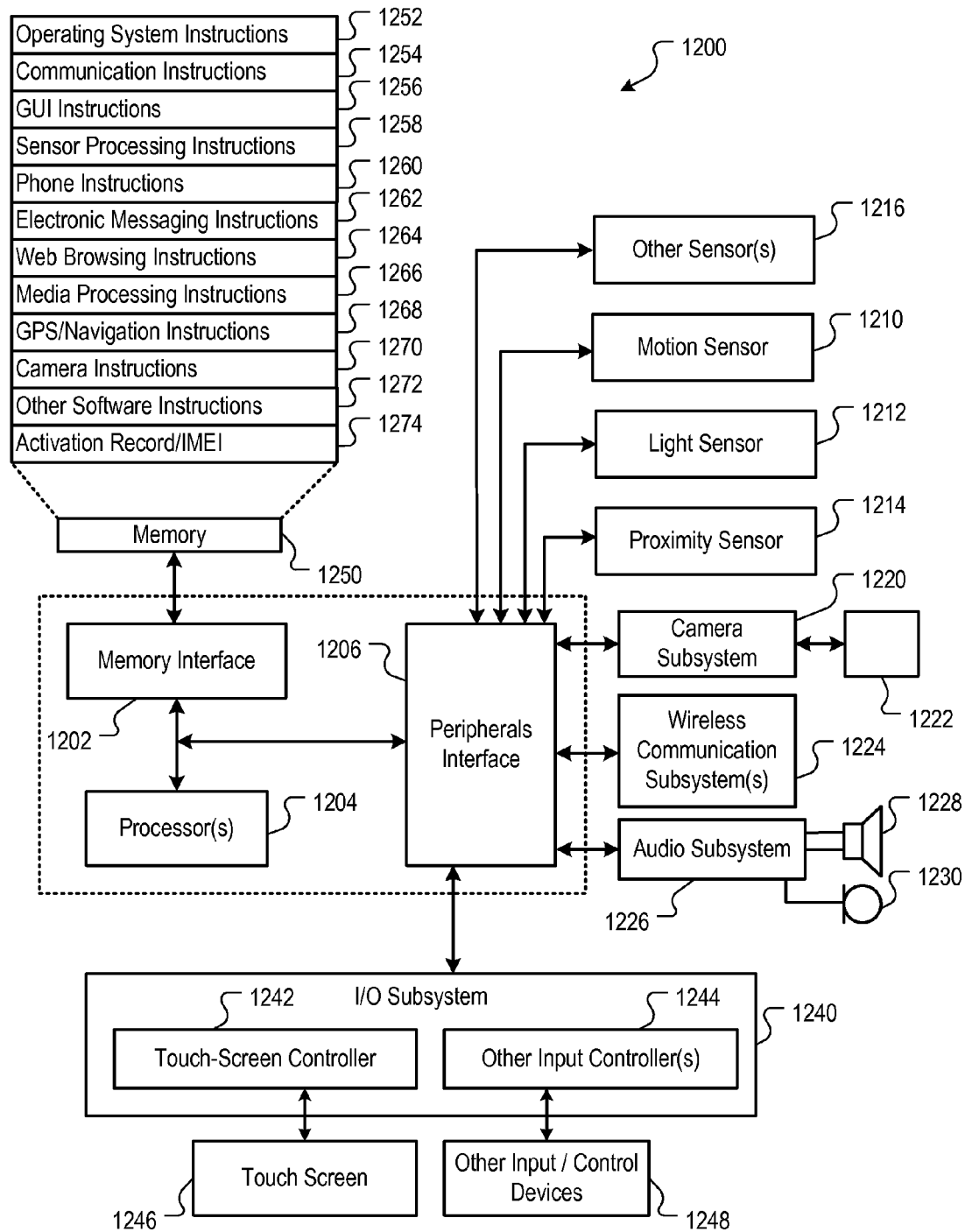
FIG. 12 is a block diagram of an example implementation of the mobile device of FIG. 1.

FIG. 12 is a block diagram 1200 of an example implementation of the mobile device 100 of FIG. 1. The mobile device 100 can include a memory interface 1202, one or more data processors, image processors and/or central processing units 1204, and a peripherals interface 1206. The memory interface 1202, the one or more processors 1204 and/or the peripherals interface 1206 can be separate components or can be integrated in one or more integrated circuits. The various components in the mobile device 100 can be coupled by one or more communication buses or signal lines.

Sensors, devices and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate orientation, lighting and proximity functions. Other sensors 1216 can also be connected to the peripherals interface 1106, such as a positioning system (e.g., GPS receiver), a temperature sensor, a biometric sensor, or other sensing device, to facilitate related functionalities.

A camera subsystem 1220 and an optical sensor 1222 (e.g., a charged coupled device (CCD) or a complementary metal-oxide semiconductor (CMOS) optical sensor), can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network(s) over which the mobile device 100 is intended to operate. For example, a mobile device 100 may include communication subsystems 1224 designed to operate over a GSM network, a GPRS network, an EDGE network, a Wi-Fi or WiMax network, and a Bluetooth™ network. In particular, the wireless communication subsystems 1224 may include hosting protocols such that the device 100 may be configured as a base station for other wireless devices.

An audio subsystem 1226 can be coupled to a speaker 1228 and a microphone 1230 to facilitate voice-enabled functions, such as voice recognition, voice replication, digital recording, and telephony functions.

The I/O subsystem 1240 can include a touch screen controller 1242 and/or other input controller(s) 1244. The touch-screen controller 1242 can be coupled to a touch screen 1246. The touch screen 1246 and touch screen controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration may disengage a lock of the touch screen 1246; and a pressing of the button for a second duration that is longer than the first duration may turn power to the mobile device 100 on or off. The user may be able to customize a functionality of one or more of the buttons. The touch screen 1246 can, for example, also be used to implement virtual or soft buttons and/or a keypad or keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 30-pin dock connector that is compatible with the iPod. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks. The operating system 1252 may include instructions for handling basic system services and for performing hardware dependent tasks.

The memory 1250 may also store communication instructions 1254 to facilitate communicating with one or more additional devices, one or more computers and/or one or more servers. The memory 1250 may include graphical user interface instructions 1256 to facilitate graphic user interface processing. For example, the graphical user interfaces described with respect to FIGS. 1-8 can be implemented with graphic user interface instructions 1256. The memory 1250 may also include sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/Navigation instructions 1268 to facilitate GPS and navigation-related processes and instructions; camera instructions 1270 to facilitate camera-related processes and functions; and/or other icon process instructions 1272 to facilitate processes and functions, as described in reference to FIGS. 1-8.

Each of the above identified instructions and applications can correspond to a set of instructions for performing one or more functions described above. These instructions need not be implemented as separate software programs, procedures or modules. The memory 1250 can include additional instructions or fewer instructions. Furthermore, various functions of the mobile device 100 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of configuring an account, comprising:
generating, on a mobile electronic device, an account type comprising at least two different data classes, in response to one or more user inputs selecting one or more data classes for the account type from a display of data classes available on the mobile electronic device, each data class having a plurality of settings, wherein a data class comprises an email data class, an instant message data class, a contacts data class, a calendar data class, or a bookmarks data class;
configuring at least one setting for at least one data class of the account type;
generating a first account and a second account having the account type in response to one or more user inputs which select the account type;
configuring each data class of the first account and the second account as either active or inactive in response to one or more user inputs; and
deactivating a data class of the account type, in response to one or more user inputs, wherein deactivating the data class of the account type deactivates the data class in both the first account and the second account.

2. The method of claim 1, further comprising:
displaying a visual indication of each data class that is configured as active for the first account, in response to determining that at least one data class associated with the account type is configured as active for the first account.

3. The method of claim 1,
wherein configuring at least one setting for at least one data class of the account type comprises one of: providing the account type with the at least one setting preconfigured to a default setting, or receiving a user input to configure the at least one setting.

4. The method of claim 1, wherein the second account is configured to use the at least one setting for the at least one data class, when the at least one data class is configured as active for the second account.

5. The method of claim 1, wherein at least one data class of the account type is configured as active for the first account and the at least one data class is configured as inactive for the second account.

6. The method of claim 1, further comprising:
receiving a user input to configure the at least one setting for the at least one data class, wherein the configuring of the at least one setting for the at least one data class configures the setting for the second account having the account type and does not change the setting for the first account having the account type.

7. The method of claim 1, wherein generating the account type on the mobile device comprises:
providing a user interface on the mobile device configured to enable a user to generate a new account type.

8. A non-transitory computer readable medium programmed with executable instructions that, when executed, perform a machine implemented method of configuring an account, comprising:
generating, on a mobile electronic device, an account type comprising at least two different data classes, in response to one or more user inputs selecting one or more data classes for the account type from a display of data classes available on the mobile electronic device, each data class having a plurality of settings, wherein a data class comprises an email data class, an instant message data class, a contacts data class, a calendar data class, or a bookmarks data class;
configuring at least one setting for at least one data class of the account type;
generating a first account and a second account having the account type in response to one or more user inputs which select the account type;
configuring each data class of the first account and the second account as either active or inactive in response to one or more user inputs; and
deactivating a data class of the account type, in response to one or more user inputs, wherein deactivating the data class of the account type deactivates the data class in both the first account and the second account.

9. The non-transitory computer readable medium of claim 8, further comprising:
displaying a visual indication of each data class that is configured as active for the first account, in response to determining that at least one data class associated with the account type is configured as active for the first account.

10. The non-transitory computer readable medium of claim 8,
wherein configuring at least one setting for at least one data class of the account type comprises one of: providing the account type with the at least one setting preconfigured to a default setting, or receiving a user input to configure the at least one setting.

11. The non-transitory computer readable medium of claim 8, wherein the second account is configured to use the at least one setting for the at least one data class, when the at least one data class is configured as active for the second account.

12. The non-transitory computer readable medium of claim 8, wherein at least one data class of the account type is configured as active for the first account and the at least one data class is configured as inactive for the second account.

13. The non-transitory computer readable medium of claim 8, further comprising:
receiving a user input to configure the at least one setting for the at least one data class, wherein the configuring of the at least one setting for the at least one data class configures the setting for the second account having the account type and does not change the setting for the first account having the account type.

14. The non-transitory computer readable medium of claim 8, wherein generating the account type on the mobile device comprises:
providing a user interface on the mobile device configured to enable a user to generate a new account type.

15. A system comprising:
a processing system coupled to a memory programmed with executable instructions that, when executed, perform a machine implemented method of configuring an account, comprising:
generating, on a mobile electronic device, an account type comprising at least two different data classes, in response to one or more user inputs selecting one or more data classes for the account type from a display of data classes available on the mobile electronic device, each data class having a plurality of settings, wherein a data class comprises an email data class, an instant message data class, a contacts data class, a calendar data class, or a bookmarks data class;
configuring at least one setting for at least one data class of the account type;
generating a first account and a second account having the account type in response to one or more user inputs which select the account type;
configuring each data class of the first account and the second account as either active or inactive in response to one or more user inputs; and
deactivating a data class of the account type, in response to one or more user inputs, wherein deactivating the data class of the account type deactivates the data class in both the first account and the second account.

16. The system of claim 15, further comprising:
displaying a visual indication of each data class that is configured as active for the first account, in response to determining that at least one data class associated with the account type is configured as active for the first account.

17. The system of claim 15,
wherein configuring at least one setting for at least one data class of the account type comprises one of: providing the account type with the at least one setting preconfigured to a default setting, or receiving a user input to configure the at least one setting.

18. The system of claim 15, wherein the second account is configured to use the at least one setting for the at least one data class, when the at least one data class is configured as active for the second account.

19. The system of claim 15, wherein at least one data class of the account type is configured as active for the first account and the at least one data class is configured as inactive for the second account.

20. The system of claim 15, further comprising:
receiving a user input to configure the at least one setting for the at least one data class, wherein the configuring of the at least one setting for the at least one data class configures the setting for the second account having the account type and does not change the setting for the first account having the account type.

21. The system of claim 15, wherein generating the account type on the mobile device comprises:
providing a user interface on the mobile device configured to enable a user to generate a new account type.

22. The method of claim 1, wherein selecting the plurality of different data classes for the account type comprises selecting a predefined account type having one or more data classes and receiving user input selecting one or more additional data classes to add to the account type.

23. The computer-readable medium of claim 8, wherein selecting the plurality of different data classes for the account type comprises selecting a predefined account type having one or more data classes and receiving user input selecting one or more additional data classes to add to the account type.

* * * * *